March 31, 1970   D. G. SHERWOOD ET AL   3,504,251
LINEAR MOTION DEVICE AND CONTROL SYSTEM
Filed April 5, 1965   4 Sheets-Sheet 1

FIG.1A.

WITNESSES
Theodore F. Wrobel
James F. Young

INVENTORS
Donald G. Sherwood
& Thomas F. Widmer
BY
ATTORNEY

United States Patent Office 3,504,251
Patented Mar. 31, 1970

---

3,504,251
LINEAR MOTION DEVICE AND CONTROL SYSTEM
Donald G. Sherwood, Pittsburgh, and Thomas F. Widmer, King of Prussia, Pa., assignors to Westinghouse Electric Corporation, Pittsburgh, Pa., a corporation of Pennsylvania
Filed Apr. 5, 1965, Ser. No. 445,539
Int. Cl. H02k 41/00
U.S. Cl. 318—135                    11 Claims The present invention is directed to linear motion devices having gripping means mounted thereon for rectilinearly moving an element in an incremental stepwise manner, and more particularly to a device of the character described which can be advanced two or more steps for each cyclic operation of the gripping means.

Present linear motion devices are particularly adapted to move various elements in a linear direction to predetermined positions, such as the elements employed in controlling a complex chemical process involving frequently high temperature and high pressure environments, or for controlling various elements of a complex machine tool. The linear elements to be positioned may be located within a sealed pressure vessel requiring some kind of sealing arrangement where the linear motion device communicates with the sealed vessel. This is especially true in the case of a nuclear power reactor where the linear elements in the form of control rods are inserted into the reactor vessel for controlling the chain reaction induced therein. In such applications, one is frequently met with the requirements of zero or virtually zero leakages.

Linear motion devices forming the prior art have utilized latching or gripping members which are actuated by suitable actuating means such as one or more solenoid coils, to cause engagement or disengagement of the element to be moved. The latching member when in its engaged position is then moved a small increment in the direction of desired linear motion after which the element is engaged by suitable holding means, which also may be actuated as aforesaid. The latching member is then unlatched from the linear element, returned to its initial position, and again latched to the element. At that time the holding means for the element is decoupled therefrom and the latching member and the element are again moved an additional increment in the aforementioned direction.

Additionally, load transfer means are sometimes associated with the aforedescribed driving mechanism to advance the linear element slightly at the moment of engagement and disengagement of the latching member and holding means from the linear element in order to eliminate frictional forces and attendant wear at such times.

In the aforementioned and similar linear motion devices, each cyclic operation of the latching member and holding means, and of the load transfer means, where used, produces only one relatively short increment of motion in either direction of travel of the linear element. Moreover, the length of each such increment is not variable without disassembling the linear motion device, and can then be done only with considerable difficulty.

Briefly, the present invention solves the above-posed problems by providing one or more auxiliary solenoid coils and attendant components all of which are employed in conjunction with the described driving mechanisms in order to impart an additional one or more increments of linear motion to the linear element for each cyclic operation of its driving mechanism. The added coils may be termed auxiliary solenoid coils inasmuch as they, in one arrangement of the invention, are energized simultaneously with the principal motion-inducing coil of known driving mechanisms and cooperate therewith to effect the additional one or more increments of linear motion.

Consequently, the added coils are relatively smaller and more inexpensive to fabricate than the primary coil or coils of the driving mechanism. It is also contemplated that the increment or increments of motion thus added to the capability of the driving mechanism can be of a different size than that of the primary increment so as to meet requirements imposed by differing operating conditions or applications of the invention.

For example, that increment of motion induced by an auxiliary motion inducing solenoid coil of the invention can be made considerably smaller than the primary increment in order to afford a fine degree of control for positioning the aforementioned linear element. In furtherance of this purpose, it is additionally contemplated that the auxiliary increment need not be introduced into every cyclic operation of the driving mechanism.

In the event that two or more auxiliary increments of motion are added to the aforementioned driving mechanism, in accordance with the invention, one of the added increments can be relatively short to afford the aforementioned fine degree of control over positioning of the linear element while the other added increment or increments can be made of substantially similar length to that of the primary motion increment in order to increase the operating speed of the linear element. Of course, all of the added increments of the latter arrangement of the invention can be furnished of normal size to attain a maximum speed of operation, as permitted by the given application of the invention.

In view of the foregoing, an object of the invention is the provision of a novel and efficient linear motion device.

A further object of the invention is the provision of a linear motion device capable of inducing two or more increments of motion for each cyclic operation of its driving mechanism.

Another object of the invention is the provision of a novel solenoid operated driving mechanism for a linear motion device.

Still another object of the invention is the provision of a novel solenoid coil arrangement for use with a linear motion device.

A still further object of the invention is the provision of a linear motion device wherein the summation of the incremental movements of each cyclic operation of its driving mechanism can be readily changed or varied so as to permit a fine degree of control over the positioning of the linear element and to permit a given linear motion device constructed in accordance with the invention to be used in a number of different applications or to meet widely varying specifications of a given general field of application. For example, different nuclear reactor plants require differing speeds of movement of their respective control rods, each of which is driven by a linear motion device. Thus, the invention permits standardization of linear motion devices.

Further objects and advantages of the invention will become apparent as the following description proceeds, and features of novelty which characterize the invention will be pointed out with particularity in the claims annexed to and forming a part of this specification.

For a better understanding of the invention, reference may be had to the accompanying drawings wherein.

Figure 1A:
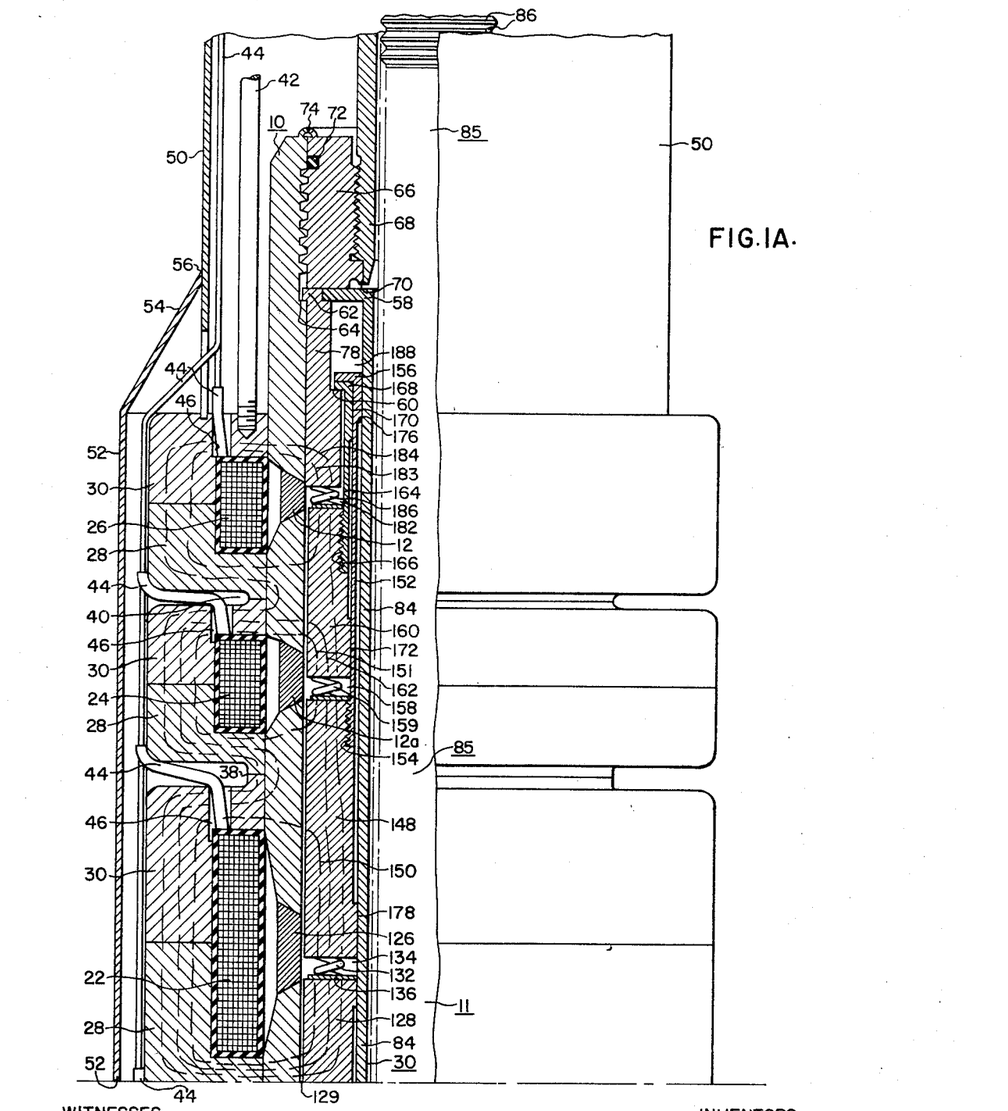
FIGURES 1A and 1B are bipartite views which together constitute a partial longitudinally sectioned view of one form of linear motion device arranged in accordance with the invention.
Figure 1B:
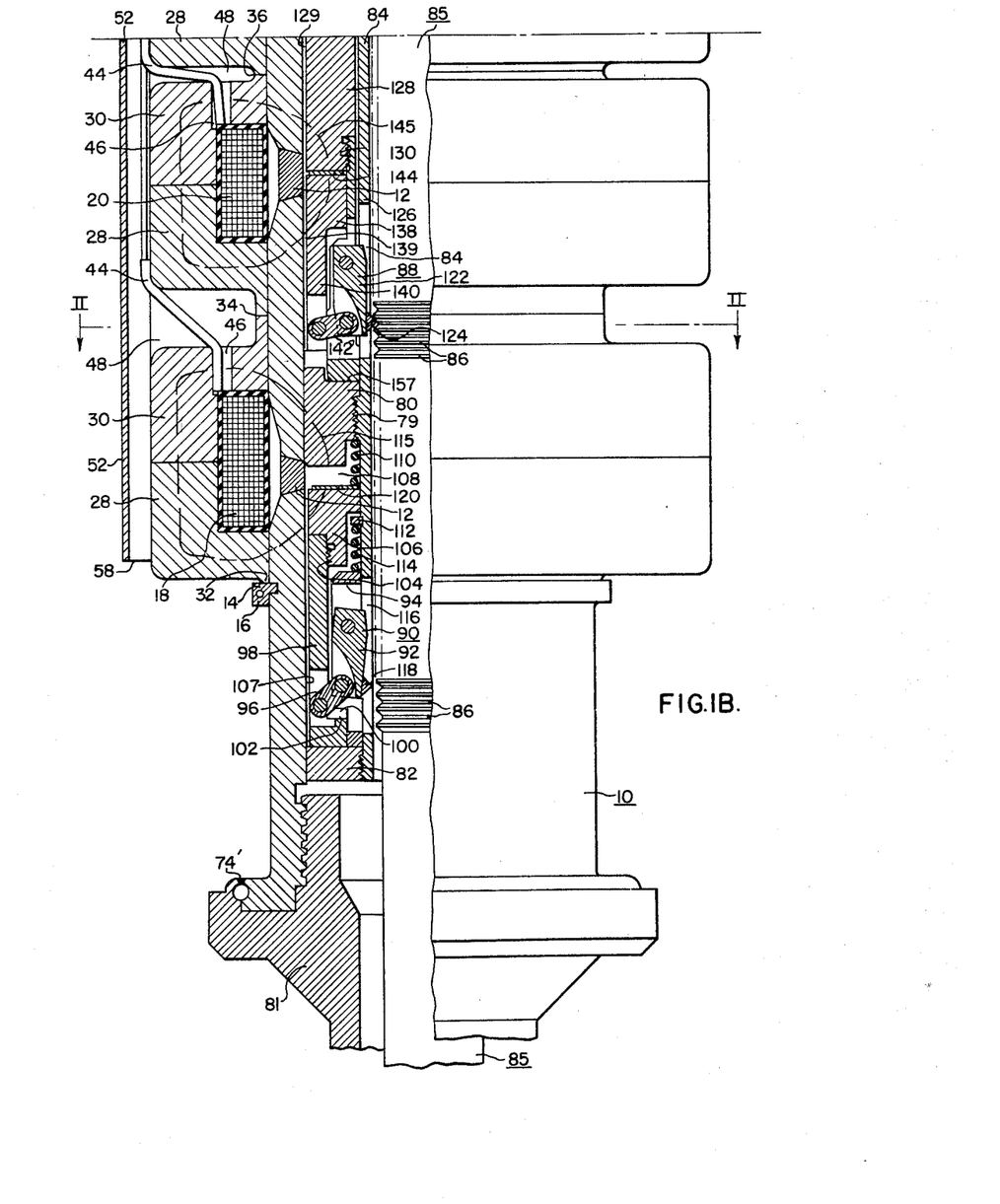
Figure 2:
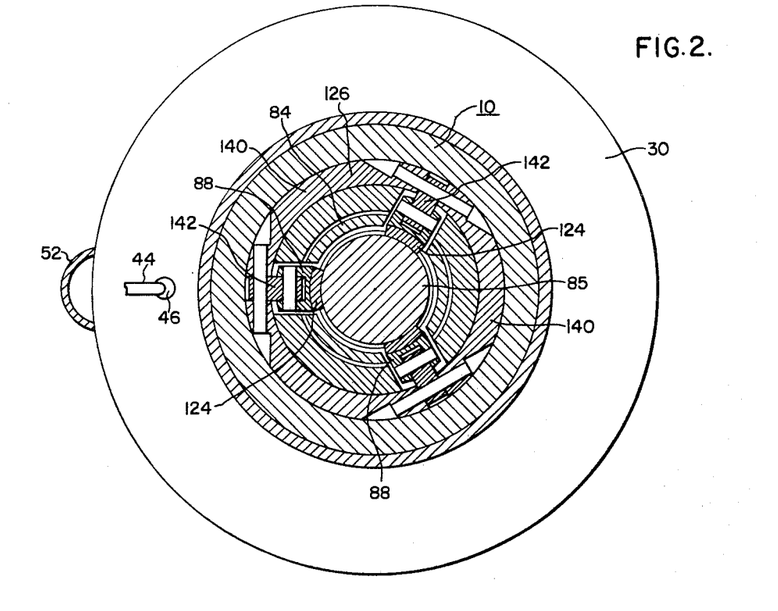
FIG. 2 is a cross-sectional view of the linear motion device illustrated in FIGS. 1A and 1B and taken along reference line II—II of FIG. 1B.

Referring now more particularly to FIGS. 1A, 1B and 2 of the drawings, the exemplary form of the invention illustrated therein comprises an outer tubular pressure housing 10, former from magnetic material and including a plurality of circumferential weld inserts 12 axially spaced therealong and positioned respectively adjacent the solenoid coils of the linear motion device. The housing 10 is further provided with a circumferential slot 14 therein which receives an annular stop member 16 with the latter serving as the lower mount for the solenoid coils presently to be described. In this arrangement of the invention, three primary solenoid coils 18, 20 and 22 and two auxiliary solenoid coils 24 and 26 are employed.

The solenoid coil 22 is designated as the primarily lift coil in this vertically disposed arrangement of the invention. The next lower solenoid coils 20 and 18 are designated the upper and lower gripper coils, respectively, or more functionally as the latch coil 20 and the load transfer coil 18. The remaining solenoid coils 24 and 26 are designated auxiliary lift coils and their function, operation, and cooperation with the primarily lift coil 22 will be described hereinafter in greater detail.

Each solenoid coil 18–26 is provided with an annular bipartite housing with each housing part having a generally L-shaped cross section. The bipartite housing is formed from L-shaped members 28 and 30 mounted in opposed relationship and forming an annular space therebetween in which there is disposed one of the aforementioned solenoid coils. The bipartite housing members 28 and 30 likewise are fabricated from magnetic material and, with the adjacent magnetic portions of the pressure housing 10, define the magnetic circuits of the associated solenoid coils 18–26. The lower bipartite housing part 28 for the lowermost or load transfer coil 18 is provided with a downwardly extending rim 32 disposed to engage the annual stop member 16. The adjacent housing parts of adjacent solenoid coils 18, 20 and 22, 24 and 26 are provided with circumferential extensions at 34 and 36, 38 and 40 which abut and thereby position each of the last-mentioned solenoid coils 18–26 relative to the housing 10 and opposite one of the non-magnetic weld inserts 12, respectively.

Means for fixedly positioning the solenoid coil stack at the upper or other end thereof are provided. One such means includes tie rods 42 which can be suitably secured to a locking ring member (not shown) mounted adjacent to the top of the linear motion device.

In this arrangement of the invention, either an alternating or a direct current electric potential is suitably supplied to each of the coils 18–26 by electrical conductors denoted generally by the reference character 44. The conductors 44 are led into their respective coils 18–26 through longitudinal openings 46 extending through each of the bipartite housing members 30 for each of the coils 18, 20, 22, 24 and 26.

The aforementioned conductors 44 are conducted into the coil stack from suitable terminals (not shown) located adjacent the top of the linear motion device, by means of a tubular outer container, a portion of which is shown at 50. The outer surfaces of the coil stack together with their conductors 44 are protected by a relatively larger tubular shield 52 extending axially adjacent leads 44 and which is provided at its upper end with a frustoconical section 54 for securance to the first-mentioned tubular member 50, as denoted by reference character 56. The lower end 58 of the coil stack shield 52 is left open to provide for ready removal of the shield 52 and access to the coil stack.

In this arrangement of the invention, an upper stop member 78, intermediate stop member 80, and a lower stop member 82 of annular configuration are provided within the bore defined by the housing 10 at positions closely adjacent the inner surfaces thereof. The purpose of the stop members is to limit the movements of the respective armatures 106, 128, 148 and 160 presently to be described. The intermediate stop member 80 and the lower stop member 82 are fixedly mounted in axially spaced relationship to one another by threaded securement to a tubular spacer 84.

The tubular spacer 84 is provided at its upper end with an outwardly extending flange 58 which is clamped between end ring 66 and stop 78 to fixedly position the stops 80 and 82. Stop 78 is fixedly positioned by the clamping of flange 62 thereof between shoulder 64 of housing 10 and end ring 66.

A linear element upper housing 68 only part of which is shown in FIG. 1A, is threadedly secured to the inner circumference of the upper housing end ring 66. This housing 68, of course, communicates with the interior of the linear motion device to permit the latter to be subjected to substantial internal pressures. Accordingly, a suitable closing means is provided at the upper end (not shown) of the linear element upper housing 68. To ensure the integrity of the housing 68 at the position of engagement thereof with the end ring 66, a circumferential seal weld desirably is provided at 70 to seal hermetically the junction of the linear element upper housing 68 with the main housing 10. In furtherance of this purpose, the housing end ring 66 is hermetically sealed to the upper end of the housing by means of O-ring 72 and canopy seal weld 74.

The lower end of the housing 10, as viewed in FIG. 1B of the drawings, is closed by a threaded connection to an adapter member 81 which is also sealed to the housing 10 by a canopy seal weld 74′.

In this arrangement of the invention a linear element such as a drive rod or lead screw 85 includes a plurality of axially spaced teeth 86 which extend circumferentially about the outer surface of the drive rod 85. A pair of gripper assemblies are provided to engage the lead screw 85 and to provide incremental linear movement thereof in opposite directions of its path of travel. The upper gripper assembly is denoted by reference character 88 and the lower gripper assembly by reference character 90. The lower gripper assembly 90 is provided wtih at least one gripper arm 92 which is pivotally secured to a support annulus or tube 94. In this arrangement, three such gripper arms 92 are provided. A link member 96 is pivotally secured to the gripper arm 92 and to a second support tube 98. The support tube 98 extends downwardly to a position of engagement with the lower stop member 82. The support annulus 94 desirably is provided with a downwardly facing shoulder 100 which is disposed to be engaged by a circumferential upwardly facing flange 102 formed on the lower end of the support tube 98 and underlying the shoulder 100. The flange 102 desirably is spaced from the shoulder 100 when the solenoid coil 18 is deenergized.

The support tube 98 is secured by suitable means such as threading at 104 to a tubular gripper operating armature 106. The tubular armature 106 and the intermediate stop member 80 comprise the poles for the lower gripper or load transfer solenoid coil 18. The tubular armature 106 is slidably mounted upon the spacer tube or sleeve 84 and spaced from the adjacent wall surfaces of housing 10 to provide a clearance 107 whereby operation thereof is facilitated. The armature 106 is movable, upon energization of the solenoid coil 18, toward the lower surface of the intermediate stop member 80 to close the air gap 108 therebetween. Biasing means, such as one or more springs 110, are disposed in compression between the stop member 80 and the upper surface of the armature 106. Load transfer biasing means are coupled to the lower gripper assembly 90 and comprise a stop ring 112 secured against a shoulder formed on the outer surface of the spacer tube 84 together with a coil spring 114 surrounding the spacer tube 84 and compressed between the stop ring 112 and the upper surface of the gripper support annulus 94. The biasing spring 114, upon energization of the solenoid coil 18, prevents the gripper support annulus 94 from moving upwardly against the force of the spring 114 until the flange 102 engages the shoulder 100.

Energization of the lower gripper or load transfer solenoid coil 18 creates a magnetic flux, as denoted by the dashed lines 115, through the air gap 108 which tends to close the latter. The lower gripper armature 106 thus moves upwardly toward the intermediate stop 80 against the force of the coil spring 110. It is to be noted that the flux pattern 115 created by energization of the solenoid coil 18 extends through the bipartite housing members 28–30 and the adjacent magnetic portions, respectively, of the housing 10, which magnetic portions, of course, are separated magnetically by the adjacent non-magnetic insert 12.

During the initial upward movement of the armature 106 to close the air gap 108, the support annulus 94 remains stationary due to the bias imparted by the spring 114, and the gripper arm 92 is swung inwardly through an opening 116 in the spacer tube 84 until the tip 118 thereof is in an engaged position of non-bearing contact with the drive rod 85. At that point, the flange 102 engages the shoulder 100 and the armature 106 carries the support annulus 94, the gripper assembly 90, and the drive rod 85 upwardly for a distance sufficient to cause the lower gripper 92 to take up the entire weight of the drive rod. This action removes the drive rod weight from the upper gripper assembly 88 and places the latter in a position of non-frictional engagement with the drive rod. A suitable non-magnetic washer 120 can be mounted on the upper surface of the armature 106 for the purpose of ensuring rapid decay of flux when the solenoid coil 18 is deenergized.

The upper gripper assembly 88 is provided with at least one movable gripper arm 122 having a wear-resistant, inwardly extending tip or projection 124 thereon, with the latter projection being disposed to engage the teeth 86 of the drive rod 85. In this arrangement, there are also provided three such gripper arms 122. The upper gripper assembly support tube 126 desirably is connected to a linearly movable tubular armature 128 such as by threads 130. The armature 128 forms the relatively movable pole of the lift solenoid coil 22 and for this purpose is slidably mounted on the spacer tube 84 and provided with clearance 129 relative to the housing 10.

The other pole of the lift solenoid coil 22 comprises the adjacent or first auxiliary lift armature 148. Resilient means, such as one or more coil springs 132, desirably is disposed in the gap 134 of the coil 22. The springs 132 each have one end thereof engaging a non-magnetic washer 136 placed on the upper surface of the armature 128 and their other ends (not shown) disposed in a recess (not shown) formed in the lower surface of the first auxiliary lift armature 148. In this manner, when the gap 134 is closed by energizing the lift coil 22, the springs are compressed and recede entirely into the last-mentioned recess.

Movement of the armature 128 to close the gap 134 results in upward movement of the support tube 126 together with the upper gripper assembly 88. In the event the arms 122 of the upper gripper assembly 88 are in the bearingly engaged or latched position relative to the drive rod 85, the upward movement of the pole 128 results in the lifting of the lead screw or drive rod 85. Pivotal movement of the upper gripper assembly 88 into and out of engagement with the drive rod 85 is accomplished by the energization or deenergization of the upper gripper or latch coil 20. The latch coil 20 includes as a pole thereof the aforedescribed main lift armature 128 together with a tubular gripper operating armature 138. The gripper operating armature 138, which is slidably mounted on the support tube 126, with clearance 139 relative to the housing 10, includes a downwardly extending projection 140 which pivotally supports one end of each link member 142. The link members 142 are pivotally mounted at their other ends on the lower ends respectively of the gripper arms 122. A non-magnetic washer 144 is supported on the upper surface of gripper operating armature 138.

The latch coil 20 is illustrated in the drawing as energized, so that the air gap between the armatures 128 and 138 is shown as completely closed. The flux path of the latch coil 20 is designated by the dashed outline 145 and is directed about the latch coil 20 in a manner similar to that described above with reference to the flux path 115 of the load transfer coil 18. Deenergization of the coil 20 would result in a downward movement of the armature 138 relative to the armature 128 and would cause pivotal movement of the gripper arms 122 about their link members 142 out of engagement with the teeth 86 of the drive rod 85, thereby moving the arms 122 to the unlatched position.

It is to be noted, of course, that the air gaps for each of the solenoid coils thus far described are disposed in positions juxtaposed to the non-magnetic inserts 12 of the housing 10. It is to be further noted that in this embodiment of the invention the lower or stationary gripper assembly 90 provides the load transfer function of the linear motion device with the lifting and lowering functions thereof being performed by the upper gripper assembly 88 and the lift solenoid coil 22.

When the lift coil 22 is energized as described above to close the gap 134 between the primary lift armature 128 and the aforementioned first auxiliary lift armature 148, presently to be described in detail, a flux path about the primary lift coil 22 is initially created as denoted by the dashed outline 150. However, when the gap 134 is thus closed, the weight of the linear element 85 and those components of the driving mechanism associated with the upper gripper assembly 88 is transferred to a first supporting tube 152 which is threadedly secured to the first auxiliary lift armature 148 as denoted by the reference character 154. The first auxiliary lift armature 148 and its supporting tube 152 likewise are suspended from the upper stop member shoulder 60 by means of an overlying lip portion 156 secured to the upper end of the auxiliary support tube 152. The weight of the linear element 85 is thus transferred from the intermediate stop member 80 to the first supporting tube 152. A gap (not shown) which is equal to the aforementioned gap 134 normally existing between the primary lift armature 128 and the first auxiliary lift armature 148, appears at the junction 157 between the stop 80 and the lower end of the gripper support tube 126 and the first supporting tube 152 remains stationary. The relative movement between the upper gripper assembly 88 and the intermediate stop 80 constitutes the primary or first increment of linear motion produced by each cyclic operation of the driving mechanism. After this increment of motion is completed, the first auxiliary lift coil 24 is energized to produce an individual flux pattern 151 for coil 24 and also a combining flux pattern 162 induced by the primary lift coil 22 in cooperation with coil 24 to close the gap 158 between the upper end of the first auxiliary lift armature 148 and the lower end of a second auxiliary armature 160.

As illustrated by the flux path 162, it will be seen that the primary lift coil 22 contributes in a large measure toward closing the gap 158 adjacent the first auxiliary lift coil 24 such that a significantly smaller auxiliary lift coil 24 can be utilized than otherwise would be required.

The second auxiliary lift armature 160 is supported by a second supporting tube 164 which is threadedly secured to the second auxiliary lift armature as denoted by reference character 166. The second supporting tube 164 likewise positions the armature 16 equidistantly between stop 78 and armature 148 by suspension of tube 164 from the shouldered portion 60 of the upper or fixed stop member 78 by means of the outwardly extending lip 168 secured to the upper end of the second supporting tube 164 and normally in bearing contact with the shoulder 60. The second supporting tube 164 and the second lift armature 160 are slidably mounted upon the first supporting tube 152 at axially spaced circumferential bearing surfaces indicated by the reference character 170 and 172, respectively. Similarly, the first supporting tube 152 and the first auxiliary lift armature 148 are mounted upon the outer surface of the spacer tube 84 by means of axially spaced bearing surfaces 176 and 178, respectively.

Of course, the closure of the first auxiliary gap 158, as described above, occurs while the primary gap 134 remains closed. Thus, when the gap 158 is closed, the first supporting tube 152 is moved upwardly relative to the second supporting tube 164 and carries with it the linear element or drive rod 85, which is latched to the primary lift armature 128 through appropriate linkages of the driving mechanism which have been described above. This action, of course, introduces a gap (not shown) also between the lips 156 and 168 of the first and second supporting tubes 152 and 164, with the gap being approximately equal to the first auxiliary gap 158 before its closure.

The third motion increment of each cyclic operation of the driving mechanism illustrated herein is induced by closure of the second auxiliary gap 182 when the second auxiliary lift coil 26 is energized. At this time, however, energization of the primary lift coil 22 and the first auxiliary lift coil 24 is continued, and the electrical connections to the second auxiliary lift coil 26 are such as to introduce a flux addition in those portions of the bipartite housing members 28 and 30 which surround the first and second auxiliary lift coils 24 and 26. Thus, at least the major portion of the combined flux of the three lift coils 22–26 follows a cooperative flux pattern around all three lift coils as denoted by the dashed lines 184. The second auxiliary lift coil 26 likewise can be furnished in a size substantially smaller than the primary lift coil inasmuch as its flux 183 is aided by that of the first auxiliary lift coil 24 and the primary lift coil 22. The non-magnetic inserts 12 which are positioned respectively adjacent the first and second auxiliary gaps 158 and 182 are, of course, necessary to prevent the shunting of any part of the flux from the respective indicated paths through adjacent portions of the housing 10. The inserts 12a and 12b are made proportionately longer to accommodate upward movement, as it were, of the "closed" gaps 134 and 158 as successive increments of motion are respectively added by the auxiliary lift coils 24 and 26.

When the gap 182 is closed, the upper end of the second auxiliary lift armature 160 engages the lower end of the upper or fixed stop member 78 compressing biasing spring means 186. The springs 159 and 186 are recessed into openings (not shown) therefor upon closure of their respective gaps 158 and 182, in the manner described above in connection with the primary gap biasing spring 132. Desirably, a relatively thin non-magnetic washer similar to the washer 136 is inserted into each of the auxiliary gaps 158 and 182, to promote decay of flux when the adjacent members are separated.

Closure of the second auxiliary gap 182 causes both the first auxiliary supporting tube 152 to move upwardly one motion increment together with the linear element 85 when latched to the primary life armature 128. A gap (not shown) of similar extent to that of the second auxiliary gap 182 then appears between the second supporting tube lip 168 and the stationary shoulder 60. It will be appreciated that the gap 188 normally existing between the lip 58 of the spacer tube 84 and the lip 156 of supporting tube 152 in the at-rest positions of the nested supporting tubes 152 and 164 is of sufficient length in the axial direction to accommodate the upward movements of the supporting tubes.

Although, in the illustrated arrangement of the invention, the lift gaps 134, 158 and 182 have been shown as substantially equal in width, it is to be understood as pointed out above that one or both of the auxiliary gaps 158 and 182 can be larger or smaller than the primary gap 134. In either event, the related auxiliary lift coils 24 or 26 will be made respectively larger or smaller. In other arrangements of the invention it is contemplated that either one auxiliary lift solenoid be employed or that more than two auxiliary lift solenoids can be utilized.

Operation—Upward movement

Figure 3:
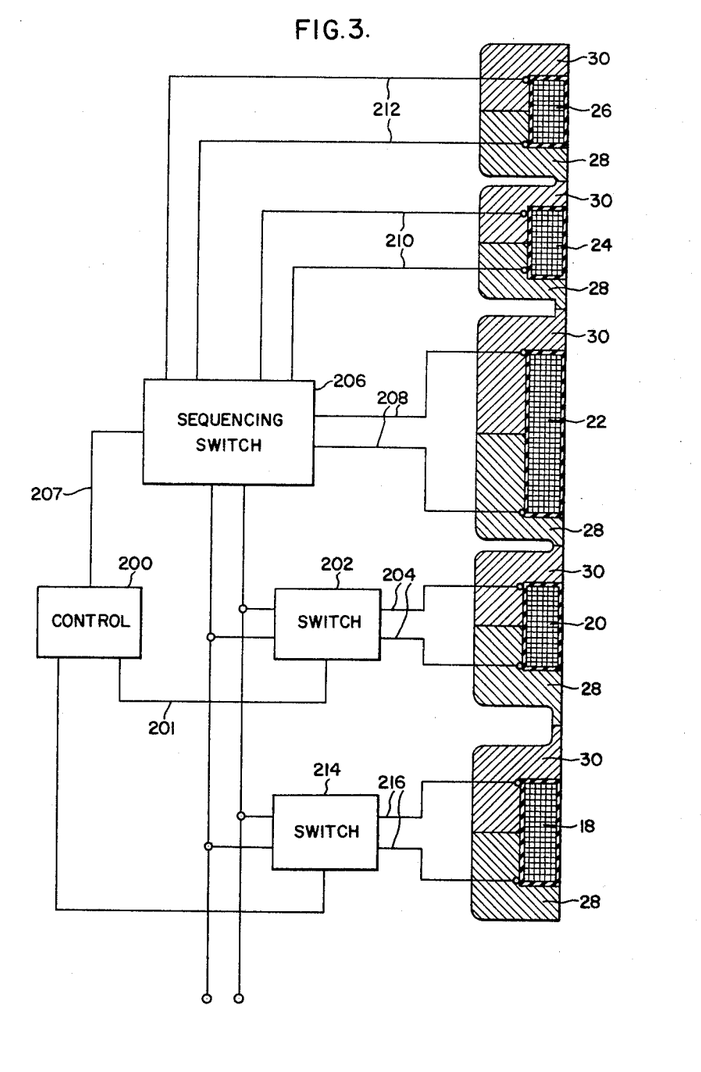
FIG. 3 is a schematic circuit arrangement which denotes generally one arrangement for controlling the cyclic operation of the driving mechanism associated with the linear motion device.

Operation of the linear motion device as illustrated is achieved by sequentially energizing and deenergizing the solenoid coils 18–26 in a predetermined manner through suitable control circuitry, one suitable form of which is illustrated schematically in FIG. 3 of the drawings. For example, if incremental upward movement of the drive rod 85 is desired, the primary lift coil 22 is energized to close the gap 134, with the gap represented by washer 144 already closed by the illustrated energization of latch coil 20, and thereby to move the upper gripper assembly 88 together with the drive rod 85 incrementally upward for a distance equal to the width of the gap 134 which, in this case, also equals the pitch between adjacent teeth 86 of the drive rod 85. This is accomplished by the sequencing circuitry of FIG. 3 wherein the control circuit 200 passes a signal through conductor 201 to maintain switch 202 in the closed position to supply electric potential to the latch coil 20 through conductors 204. With the latch coil thus energized, operation of the sequencing switch 206 is initiated by an impulse through conductor 207 which first supplies electric potential only to the primary lift coil 22 through conductors 208 to move the drive rod 85 upwardly through the first or primary motion increment. Operation of the sequencing switch 206 is then continued to supply electric potentials through conductors 210 to the first auxiliary lift coil 24 while at the same time maintaining energization of the primary lift coil 22. The cooperative energization of the primary lift coil 22 and the first auxiliary lift coil 24 closes gap 158 to move the drive rod 85 upwardly through a second motion increment of an operating cycle. The sequencing switch 206 then supplies electric potential through conductors 212 to the second auxiliary lift coil 26 while continuing the simultaneous energization of the primary lift coil 22 and the first auxiliary lift coil 24. The cooperative energization of the three lift coils 22–26 closes gap 182 to move the drive rod 85 through its third and final motion increment, in this arrangement of the invention, for each operating cycle.

At this point in the operation of the linear motion device, the control circuit 200 then causes switch 214 to be operated which energizes the load transfer coil 18 through conductors 216. The gap 108 adjacent the load transfer coil 18 is then closed which causes the lower gripper arms 92 to move first into non-bearing engagement with the drive rod 85 and then as the flange 102 of the lower gripper support tube 98 engages shoulder 100 of the lower gripper arm support annulus 94, the gripper arms 92 and the support annulus 94 are moved upwardly a sufficient distance to transfer the weight of the drive rod 85 to the lower or fixed gripper assembly 90. For a detailed description of the non-bearing engagement of the arms 92 and the drive rod 85, reference may be had to Frisch Patent 3,158,766 entitled "Gripper Type Linear Motion Device" and assigned to Westinghouse Electric Corporation. At this point in the operation, the sequencing switch 206 and the latch coil switch 202 are deenergized by the control circuit 200 which permits the lift gaps 134, 158 and 182 and the latch gap 144 to open under impetus of gravity or of the various spring biasing means employed therewith.

To commence the next operating cycle of the drive mechanism, in the upward direction, the latch coil 20 is again energized to close the adjacent gap 144 as illustrated in FIG. 1B of the drawings. This closure of the gap 144 moves the gripper arms 122 into non-bearing engagement with the drive rod 85 since the load transfer coil 18 still is energized. However, after the aforementioned engagement, the switch 214 (FIG. 3) is opened to deenergize the load transfer coil 18 and to open the adjacent gap 108. The initial portion of the resulting downward movement closes a very small gap (not shown) which normally exists between the lower end 146 of the gripper support annulus 94 and the lower stop member 82, while bearing engagement exists between the flange 102 of the support tube 98 and the shoulder 100 of the support annulus 94. At the instant the aforementioned gap 146–82 is closed, the lower gripper arms 92 are still engaged with the drive rod 85 but the weight thereof has been transferred to the upper or linearly movable gripper assembly 88. Continued downward movement of the lower gripper armature 106 and the support tube 98 actuates the link members 96 to withdraw the tips of the lower gripper arms 92 from the path of travel of the drive rod 85.

At this point the drive mechanism is ready for the next and succeeding operating cycles to continue upward movement of the drive rod 85 by sequential energization of the primary and auxiliary lift coils 22–26 and attendant energization of the remaining coils.

Operation—Downward movement

Downward incremental movement of the drive rod 85 is achieved by sequentially energizing and deenergizing the solenoid coils 18–26 as follows:

First, commencing with that point in the operating cycle illustrated in FIGS. 1A and 1B of the drawings, the load transfer coil 18 is energized moving the lower gripper arms 92 in the manner described above in connection with upward movement of the drive rod, to the latched position thereof with the drive rod 85, which removes the weight of the drive rod from the upper gripper arms 122. Next, the latch coil 20 is deenergized moving the upper gripper arms 122 away from the drive rod 85 to their unlatched positions. The opening of switch 202 is suitably controlled by the control circuit 200 so that the latch coil 20 is deenergized substantially at the moment of weight transfer or very shortly thereafter to attain an optimum speed of movement of the linear motion device. Now, all of the lift coils 22–26 are energized to close the respectively adjacent gaps 134, 158 and 182 thereby moving the upper gripper arms 122 upwardly a distance equal to three motion increments, while retaining the same in the unlatched position.

At this time, the drive rod 85 is held stationary relative to the housing 10 by means of the lower gripper arms 92. Now, the action of the sequencing switch 206 is reversed by the control circuit 200 to obtain downward movement. With the lift coils 22–26 now being energized by reversing the operating cycle of sequencing switch 206, the latch coil 20 now is energized by the control circuit 200 and switch 202 to move the armature 138 into engagement with the armature 128 and to displace the upper gripper arms 122 toward their latched positions with the drive rod 85. The load transfer coil 18 now is deenergized by opening switch 214 to transfer the weight of the drive rod 85 to the upper gripper arms 122 and to permit the lower gripper arms 92 to move out of the path of drive rod travel to their unlatched positions.

At this point in the operation, the sequencing switch 206 deenergizes the uppermost or second auxiliary lift coil 26 to open gap 182 and to permit the drive rod 85 to drop one motion increment as limited by engagement of the second auxiliary support tube lip 168 with the shoulder 60 of the upper fixed stop member 78. Continued operation of the sequencing switch 206 then deenergizes the first auxiliary lift coil 24 to open gap 158 and to permit the drive rod 85 to drop a second motion increment until bearing contact of the first supporting tube lip 156 with the second supporting tube lip 168 occurs. Further operation of the sequencing switch 206 then deenergizes the primary lift coil 22, and with the auxiliary lift coils remaining deenergized, gap 134 is opened to permit the drive rod 85 to drop a third and final motion increment in each cycle of operation in this arrangement of the invention. At this time, the supporting lips 156 and 168 are in bearing contact with the upper fixed member shoulder 60, as illustrated in FIG. 1A. It is contemplated, of course, in other arrangements or applications of the invention that the sequencing switch 206 when reversed in action can energize and deenergize the lift coils 22–26 simultaneously to permit the drive rod 85 to drop through the combined distance of three motion increments for each operating cycle. Further downward incremental movement of the drive rod 85 is achieved by repeating the above-described cycle. More rapid lowering or "scram" of the drive rod 85 can, of course, be accomplished by the simultaneous deenergization of all of the coils 18–26 to permit free fall of the drive rod.

It is to be realized that numerous modifications and changes may be made to the apparatus illustrated and described in the specification and drawings. These modifications may fall within the broad spirit and scope of this invention. Accordingly, it is specifically intended that the detailed description of the embodiments of this invention be interpreted as illustrative of the invention and not as limitative thereof.

We claim as our invention:

1. In a linear motion device, an elongated linearly movable element, a plurality of armatures positioned outwardly of said element, said armatures being spaced in tandem along a portion of the length of said element and movable in the direction of said element, biasing means disposed between each of said armatures to maintain said spacing, latch means connecting said element to one of said armatures, and means for closing successively each of the spaces between said armatures to move said element incrementally in said direction.

2. In a linear motion device, the combination comprising holding means, latching means, and a plurality of motion inducing means, a support structure for said linear motion device arranged generally parallel to the path of travel of a linear element moved by said linear motion device, said holding means and latching means and motion inducing means being mounted on said support structure and spaced therealong, said holding means being fixedly mounted on said support and said latching means and said motion inducing means being movably mounted on said support, said latching means being engageable with said linear element to detachably couple said element to said motion inducing means, said holding means being engageable with said linear element to secure said element to said support, and means for sequentially operating said plurality of motion inducing means with said latch means being engaged with said element to move said element through a like plurality of motion increments, and means for sequentially operating said holding means relative to said latching means to secure said linear element relative to said support when said motion inducing means are deactivated.

3. In a linear motion device, the combination comprising a generally tubular housing capable of spacedly receiving a linear element when inserted therethrough, a holding mechanism fixedly mounted on said housing and disposed therein in the space between said housing and said linear element when inserted, said holding mechanism when actuated engaging said linear element to fixedly position the latter to said housing, a latching mechanism movably mounted within said housing in the space between said housing and said linear element, said latching mechanism when actuated being secured to said linear element for movement therewith, and a plurality of motion inducing mechanisms mounted within said housing, said last-mentioned mechanisms being engageable with said latching mechanism for moving the latter and said linear element in the desired direction of travel of said linear element.

4. In a linear motion device, the combination comprising a generally tubular elongated housing structure, said housing being capable of spacedly receiving a linear element when inserted therein, a spacer tube closely spaced around said linear element and fixedly positioned in said housing, a generally tubular holding mechanism fixedly secured to said housing in the space between said housing and said linear element, said holding mechanism being positioned adjacent one end of said spacer tube but removed therefrom, a latching mechanism movably mounted on said spacer tube, said latching mechanism having at least one latch member extendable through an opening therefor in said spacer tube for engagement with said linear element to secure said linear element to said latching mechanism, and a plurality of generally tubular motion inducing mechanisms mounted in the space between said housing and said spacer tube, each of said motion mechanisms having means securable to said latching mechanism, and means for successively actuating said motion mechanisms to impart successive increments of motion to said latching mechanism and said linear element when engaged therewith.

5. In a linear motion device, the combination comprising a generally tubular elongated housing structure, said housing being capable of spacedly receiving a linear element when inserted therein, a generally tubular holding mechanism fixedly secured to said housing in the space between said housing and said linear element, a latching mechanism movably mounted in said housing, said latching mechanism having at least one latch member movable into engagement with said linear element to secure said linear element to said latching mechanism, and a plurality of generally tubular motion-inducing mechanisms mounted in the space between said housing and said linear element, each of said motion mechanisms having means securable to said latching mechanism, means for successively actuating said motion mechanisms to impart successive increments of motion to said latching mechanism and said linear element when latched thereto, said holding and latching and motion-inducing mechanisms each including a movable magnetic armature operatively coupled thereto, and a like number of solenoid coil means mounted on the exterior of said housing at positions respectively adjacent said armatures for operating said mechanisms.

6. In a linear motion device, the combination comprising an elongated generally tubular housing capable of spacedly receiving an elongated linear element when inserted therein, said linear element being positioned substantially coaxially of said housing when so inserted, a number of nested tubular members of varying lengths mounted with the space between said housing and said linear element, latch mechanism of generally tubular configuration disposed in said space and movably mounted on the innermost one of said nested tubes, a plurality of generally tubular motion-inducing mechanisms movably mounted in said space, each of said motion-inducing mechanisms being mounted respectively on said nested tubes and being movable relative to the others of said nested tubes, means for securing said latch mechanism successively to said motion-inducing mechanism for movement therewith, and holding mechanism of tubular configuration substantially fixedly mounted on said housing and disposed in the space between said housing and said linear element for securing said linear element to said housing when said latching mechanism is deactivated.

7. In a linear motion device, the combination comprising an elongated generally tubular housing capable of spacedly receiving a linear element when inserted therein, said housing being formed from a plurality of tubular segments fabricated from a magnetic material and a number of alternating non-magnetic inserts secured therebetween, circumferential solenoid coil means mounted on the outer surface of said housing adjacent each of said non-magnetic inserts, a generally tubular holding mechanism fixedly mounted on the inner wall of said housing and closely spaced from said linear element when so inserted, said holding mechanism including a first magnetic stop member and movable armature normally spaced therefrom, said space being disposed adjacent the non-magnetic insert of one of said coil means for closure by energization of said one coil means, a plurality of generally tubular motion-inducing mechanisms mounted in the space between said housing and said linear element, said motion mechanisms having a like number of movable armatures normally mounted with spaces therebetween and between a second magnetic stop member, said last-mentioned spaces being disposed respectively adjacent others of said non-magnetic inserts and associated coil means, latching mechanism secured to an endmost one of said motion armatures opposite from said second stop member, said latching mechanism having a movable armature coupled thereto and spaced from said second endmost motion armature with the space therebetween being adjacent the remaining one of said non-magnetic inserts and the associated solenoid coil means so that energization of said last-mentioned coil means engages said latch mechanism with said linear element for movement with said last-mentioned motion armature and with the remainder of said armatures when their associated coil means are likewise energized.

8. In a linear motion device, the combination comprising an elongated generally tubular housing capable of spacedly receiving an elongated linear element when inserted therein, said linear element being positioned substantially coaxially of said housing when so inserted, a number of nested tubular members of varying lengths mounted within the space between said housing and said linear element, latch mechanism of generally tubular configuration disposed in said space and movably mounted on the innermost one of said nested tubes, a plurality of generally tubular motion inducing mechanisms movably mounted in said space, each of said motion-inducing mechanisms being mounted respectively on said nested tubes and being movable relative to the others of said nested tubes, means for securing said latch mechanism successively to said motion-inducing mechanisms for movement therewith, and holding mechanism of tubular configuration substantially fixedly mounted on said housing and disposed in the space between said housing and said linear element for securing said linear element to said housing when said latching mechanism is deactivated and engageable projections on said nested tubes disposed so that successive operation of said motion-inducing mechanisms successive increments of motion are imparted to said latching mechanism, said nested tubes having overlying out-turned flanges at one end thereof and means for biasing said flanges against a stop affixed at the interior wall of said housing to determine the initial positions of said tubes and their associated motion-inducing mechanisms.

9. In a linear motion device, an elongated tubular housing, an elongated movable element positioned coaxially in said housing in spaced relationship therewith and for axial movement relative thereto, a pair of axially spaced stop members fixedly positioned in said housing in the space between said housing and said movable element, of tandemly disposed armatures disposed in said last-mentioned space and positioned between said stop members, biasing means for spacing said armatures away from another and away from one of said stop members, a plurality of nested tubular members of varying lengths mounted in said space and secured respectively to said armatures, each of said tubular members extending between said element and said one stop member, said one stop member forming a shoulder on a circumferential surface thereof facing a direction remote from the other of said stop means, and each of said tubular members having a lip formed thereon overlying said shoulder, said tubular members being sized to maintain the spacing respectively between said armatures and said one stop member, a latching mechanism positioned between said other stop means and the adjacent one of said armatures, and means for sequentially closing the spaces between said armatures against the face of said biasing means.

10. In a linear motion device, an elongated tubular housing, an elongated movable element positioned coaxially in said housing in spaced relationship therewith and for axial movement relative thereto, a pair of axially spaced stop members fixedly positioned in said housing in the space between said housing and said movable element, of tandemly disposed armatures disposed in said last-mentioned space and positioned between said stop members, biasing means for spacing said armatures away from one another and away from one of said stop members, a plurality of nested tubular members of varying lengths mounted in said space and secured respectively to said armatures, each of said tubular members extending between said element and said one stop member, said one stop member forming a shoulder on a circumferential surface thereof facing a direction remote from the other of said stop means, and each of said tubular members having a lip formed thereon overlying said shoulder, said tubular members being sized to maintain the spacing respectively between said armatures and said one stop member, a latching mechanism positioned between said other stop means and the adjacent one of said armatures, said latching member including a pair of axially spaced supporting members a gupper means pivotally secured to said supporting members for movement toward or away from said movable element in response to the respective closing and opening of the axial space between said supporting members, means for moving said supporting members axially toward and away from each other, and means for sequentially closing the spaces between said armatures against the face of said biasing means.

11. In a linear motion device, an elongated tubular housing, an elongated movable element positioned coaxially in said housing in spaced relationship therewith and for axial movement relative thereto, a pair of axially spaced stop members fixedly positioned in said housing in the space between said housing and said movable element, of tandemly disposed armatures disposed in said last-mentioned space and positioned between said stop members, biasing means for spacing said armatures away from one another and away from one of said stop members, a plurality of nested tubular members of varying lengths mounted in said space and secured respectively to said armatures, each of said tubular members extending between said element and said one stop member, said one stop member forming a shoulder on a circumferential surface thereof facing a direction remote from the other of said stop means, and each of said tubular members having a lip formed thereon overlying said shoulder, said subular members being sized to maintain the spacing respectively between said armatures and said one stop member, a latching mechanism positioned between said other stop means and the adjacent one of said armatures, said supporting members and said armatures being formed from magnetic material, a first coil means mounted on said housing for moving said supporting means axially toward each other, a second coil means mounted on said housing and positioned adjacent the adjacent ones of said armatures and supporting members to move said adjacent supporting member toward said adjacent armatures and additional coil means mounted on said housing adjacent each of the axial spaces respectively between said one stop member and said armatures means for energizing said coil means to close said axial spaces against the forces of said biasing means.

References Cited

UNITED STATES PATENTS

| | | | |
|---|---|---|---|
| 3,122,027 | 2/1964 | Frisch et al. | 310—12 X |
| 3,158,766 | 11/1964 | Frisch | 310—14 |
| 3,219,854 | 11/1965 | McLaughlin | 310—14 |
| 3,299,302 | 1/1967 | Frisch | 310—12 |

J D MILLER, Primary Examiner

D. F. DUGGAN, Assistant Examiner